(12) United States Patent
Morgan

(10) Patent No.: US 12,488,375 B2
(45) Date of Patent: Dec. 2, 2025

(54) WINE-FOOD PAIRING SYSTEM

(71) Applicant: Kathleen Morgan, Gloucester, MA (US)

(72) Inventor: Kathleen Morgan, Gloucester, MA (US)

( * ) Notice: Subject to any disclaimer, the term of this patent is extended or adjusted under 35 U.S.C. 154(b) by 240 days.

(21) Appl. No.: 18/306,360

(22) Filed: Apr. 25, 2023

(65) Prior Publication Data
US 2024/0362700 A1 Oct. 31, 2024

(51) Int. Cl.
G06Q 30/06 (2023.01)
G06Q 30/0601 (2023.01)
G06Q 50/12 (2012.01)

(52) U.S. Cl.
CPC ..... *G06Q 30/0631* (2013.01); *G06Q 30/0629* (2013.01); *G06Q 30/0641* (2013.01); *G06Q 50/12* (2013.01)

(58) Field of Classification Search
CPC ........... G06Q 30/0641; G06Q 30/0643; G06Q 30/0629; G06Q 30/0631
USPC ....................................... 705/27.1
See application file for complete search history.

(56) References Cited

U.S. PATENT DOCUMENTS

| | | | |
|---|---|---|---|
| 9,659,320 B2 | 5/2017 | Martucci et al. | |
| 11,865,459 B1 * | 1/2024 | Leondires | A63F 13/48 |
| 2002/0111899 A1 | 8/2002 | Veltre et al. | |
| 2008/0275761 A1 | 11/2008 | Seifer et al. | |
| 2009/0215479 A1 * | 8/2009 | Karmarkar | H04W 4/02 |
| | | | 455/466 |
| 2011/0225050 A1 | 9/2011 | Varghese | |
| 2012/0303470 A1 | 11/2012 | Arsenault | |
| 2013/0071818 A1 | 3/2013 | Buxton, Jr. et al. | |
| 2013/0149677 A1 | 6/2013 | Slone et al. | |
| 2013/0332809 A1 | 12/2013 | Pickelsimer | |
| 2013/0339348 A1 | 12/2013 | Pickelsimer | |
| 2014/0282586 A1 * | 9/2014 | Shear | H04L 47/70 |
| | | | 718/104 |
| 2014/0324624 A1 | 10/2014 | Ward et al. | |
| 2015/0186951 A1 | 7/2015 | Wilson et al. | |
| 2016/0092885 A1 * | 3/2016 | Creager | G06Q 30/018 |
| | | | 705/317 |

(Continued)

FOREIGN PATENT DOCUMENTS

| | | | | |
|---|---|---|---|---|
| CN | 114365176 A | * | 4/2022 | ............... G06F 3/14 |
| KR | 101230034 | | 3/2013 | |
| KR | 1020220128883 | | 9/2022 | |

OTHER PUBLICATIONS

Liyang Liu, Junji Wu and Shaoliang Meng, "Data mining software design for wind farms," 2013 IEEE 4th International Conference on Software Engineering and Service Science, Beijing, 2013, pp. 23-26, doi: 10.1109/ICSESS.2013.6615248. retrieved from IEEE Xplore onApr. 15, 2025 (Year: 2013).*

*Primary Examiner* — Yogesh C Garg
(74) *Attorney, Agent, or Firm* — Lambert Shortell & Connaughton; David J. Connaughton, Jr.; Justin P. Tinger

(57) ABSTRACT

A wine-food pairing system utilizes a computing device in electronic communication with a server having a presentation layer and a data layer. The presentation layer of the server is a wine-food pairing website and/or web application that utilizes a method of matching wine and food based on molecular gastronomy. The resulting system enables the convenient, cost-effective, and efficient matching of wine and food by average consumers and sophisticated businesses alike.

10 Claims, 4 Drawing Sheets

(56) References Cited

U.S. PATENT DOCUMENTS

| | | |
|---|---|---|
| 2016/0159633 A1 | 6/2016 | Diffenderfer |
| 2017/0353392 A1* | 12/2017 | Nandi .................... H04L 63/104 |
| 2021/0224714 A1 | 7/2021 | Erickson et al. |
| 2022/0374884 A1* | 11/2022 | Wai ........................ G06Q 50/16 |

* cited by examiner

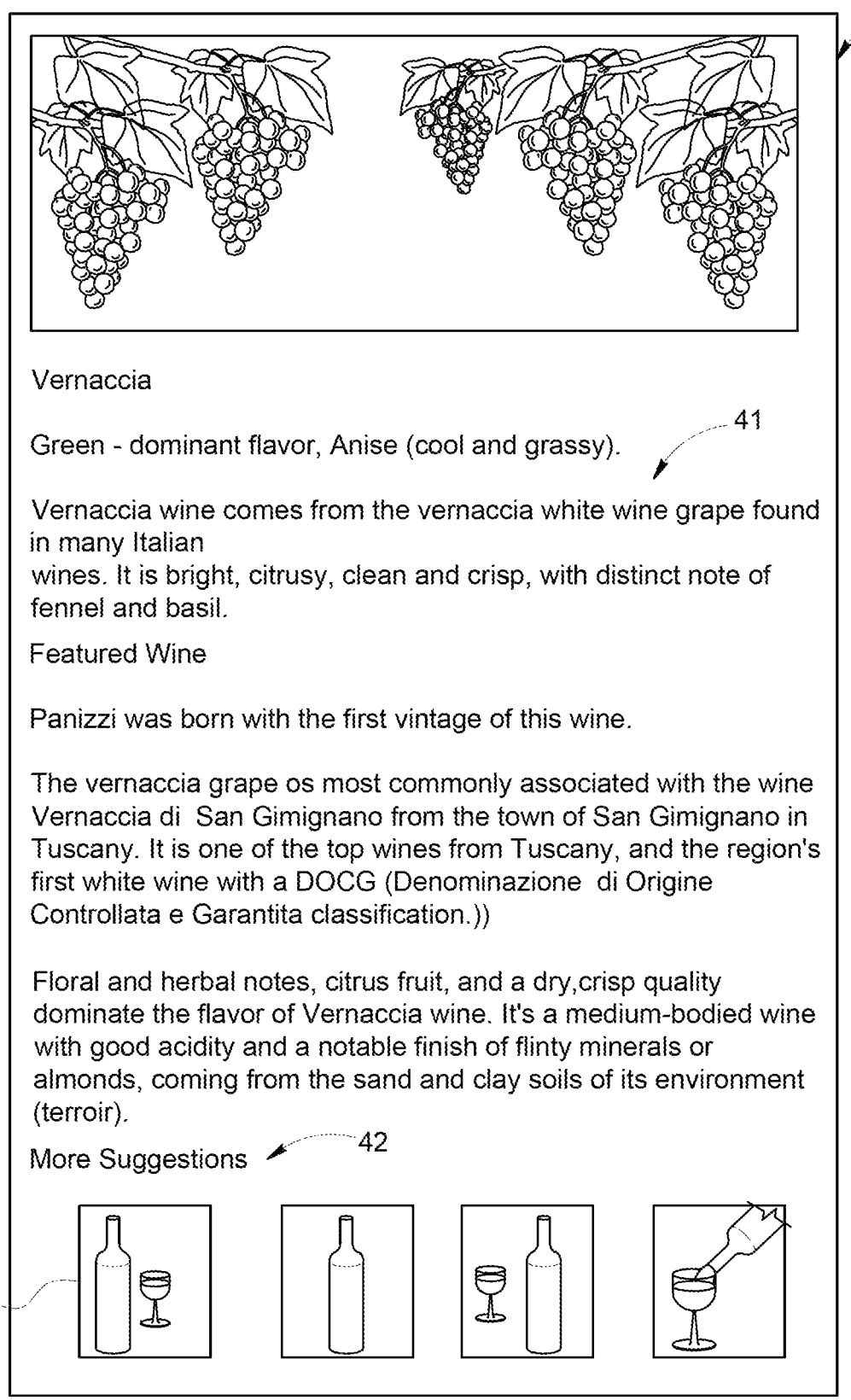

Vernaccia

Green - dominant flavor, Anise (cool and grassy).

Vernaccia wine comes from the vernaccia white wine grape found in many Italian
wines. It is bright, citrusy, clean and crisp, with distinct note of fennel and basil.

Featured Wine

Panizzi was born with the first vintage of this wine.

The vernaccia grape os most commonly associated with the wine Vernaccia di San Gimignano from the town of San Gimignano in Tuscany. It is one of the top wines from Tuscany, and the region's first white wine with a DOCG (Denominazione di Origine Controllata e Garantita classification.))

Floral and herbal notes, citrus fruit, and a dry,crisp quality dominate the flavor of Vernaccia wine. It's a medium-bodied wine with good acidity and a notable finish of flinty minerals or almonds, coming from the sand and clay soils of its environment (terroir).

More Suggestions

FIG. 4

| Pairing List | | |
|---|---|---|
| Filter | | 🔍 |
| Dishes | Wine Pairing | Wine Varietal Suggestion |
| Bagles and Lox | G1, G2 | Sparkling, Riesling, Chenin |
| Bagles and Lox | G1, G2 | Sparkling, Riesling, Chenin |
| Bagles and Lox | G1, G2 | Sparkling, Riesling, Chenin |
| Bagles and Lox | G1, G2 | Sparkling, Riesling, Chenin |
| Bagles and Lox | G1, G2 | Sparkling, Riesling, Chenin |
| Bagles and Lox | G1, G2 | Sparkling, Riesling, Chenin |
| Bagles and Lox | G1, G2 | Sparkling, Riesling, Chenin |
| Bagles and Lox | G1, G2 | Sparkling, Riesling, Chenin |
| Bagles and Lox | G1, G2 | Sparkling, Riesling, Chenin |

FIG. 5

WINE-FOOD PAIRING SYSTEM

BACKGROUND OF THE INVENTION

The present disclosure relates generally to a wine-food paring system. More particularly, the present disclosure relates to a computer system that codes the dominant flavor molecules in both wine and food based on molecular gastronomy and uses the coded information to display wine and food matches on a graphical user interface.

Taste is produced by chemical substances in food and drink that are released from the food or drink in the mouth and come into contact with nerve cells. The taste papillae on the tongue are biological structures where taste producing chemical substances in food and drink are transformed into nerve signals. The taste papillae contain many sensory cells that are activated when molecules responsible for taste replace specific proteins in the walls of the sensory cells. Once activated, the sensory cells transmit messenger substances, which in turn activates more nerve cells, until the taste signal reaches the brain.

Sommeliers (i.e., wine experts) are capable of pairing food and wine based on the known molecular structure of shared flavor molecules. For wine enthusiasts and consumers alike who want the perfect pairing of wine and food, there are a number of problems with relying on the skills of an experienced sommelier. Some of these problems include, but are not limited to, inaccessibility and cost. For example, sommeliers are often employed at restaurants and wineries, so for the average consumer and even some wine enthusiasts, interaction with sommeliers is rare.

While computer systems that attempt to replicate the knowledge of sommeliers have been conceived, such known computer systems suffer from a number of problems. There is also a seemingly endless number of solutions to these problems. Therefore, what is needed is a wine-food paring system having all of the further described features and advantages.

SUMMARY OF THE INVENTION

The subject matter of this application may involve, in some cases, interrelated products, alternative solutions to a particular problem, and/or a plurality of different uses of a single system or article.

In one aspect, a system is disclosed. In this aspect the system includes a computing device, and the computing device has a processor, a memory, and a graphical user interface. The computing device is in electronic communication with a server, and the server has a presentation layer. The server is operable to respond to a request from the computing device, and the response from the server includes the presentation layer. The computing device is then operable to display a wine-food pairing website on the graphical user interface.

In another aspect, a method is disclosed. In this aspect, the method involves a number of steps. The steps include receiving a food input from an input device by a computing device. The computing device sends the food input to a server, which receives the food input. The computing device and/or the server then assign a coded color and a coded number to the food input. The computing device and/or the server then match a wine varietal to the food input.

BRIEF DESCRIPTION OF DRAWINGS

FIG. 4 provides a perspective view of one embodiment of a graphical user interface according to the present disclosure.

FIG. 5 provides a perspective view of another embodiment of a graphical user interface according to the present disclosure.

DETAILED DESCRIPTION OF THE INVENTION

Figure 1:
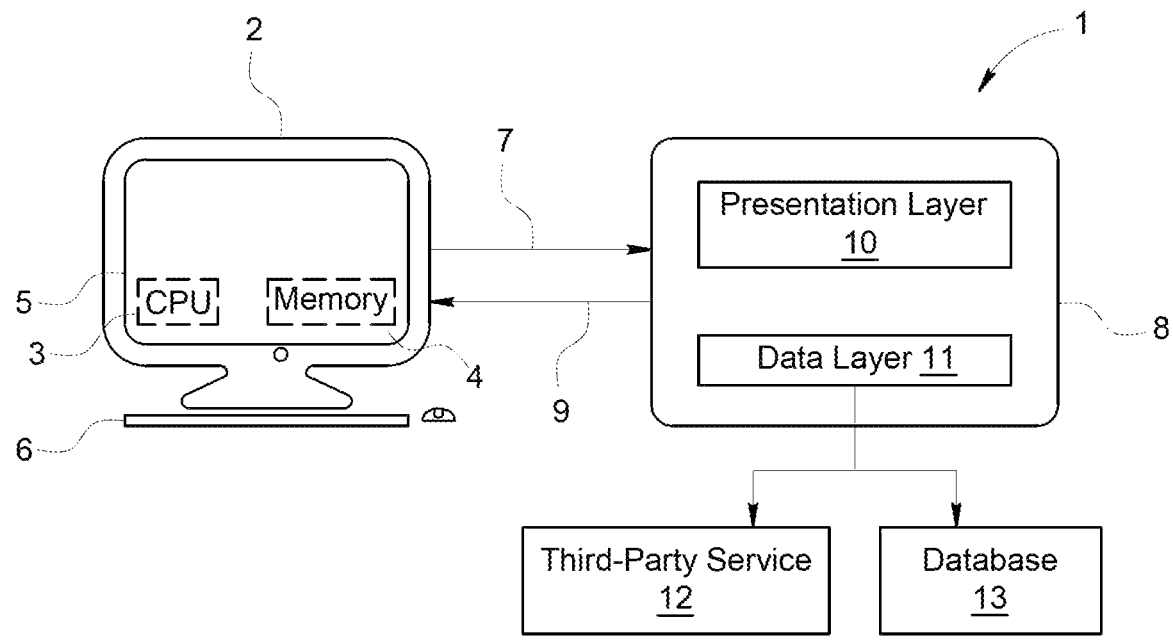
FIG. 1 provides a diagrammatic representation of one embodiment of the wine-food pairing computer system.

The detailed description set forth below in connection with the appended drawings is intended as a description of presently preferred embodiments of the invention and does not represent the only forms in which the present disclosure may be constructed and/or utilized. The description sets forth the functions and/or the sequence of steps for constructing and operating the invention in connection with the illustrated embodiments.

Generally, the present disclosure concerns a wine-food paring system. Specifically, the present disclosure relates to a computer system that codes the dominant flavor molecules in both wine and food based on molecular gastronomy and uses the coded information to display wine and food matches on a graphical user interface ("GUI"). The computer system may be embodied in a website and/or web application that is accessible to a plurality of users. When used herein, the terms "website" and/or "web application" refer generally to a computer-based system and method that is capable of carrying out the steps of a method.

In one embodiment, the system may include a non-transitory computer readable medium having computer programming instructions allowing and instructing a central processing unit ("CPU" or "processor") to carry out the steps required to match wine and food, as described further herein. This non-transitory computer readable medium may be stored within a memory housed in a computing device, or it may be accessible through an electronic communication system, such as a network. The processor may execute the programming instructions in response to inputs from one or more input devices.

When used herein the term "computing device" means any electronic device having a processor, memory, and a GUI display, including, but not limited to, a cellular phone, a tablet, a laptop, or a desktop. Similarly, when used herein the term "network" refers to any system of interconnected electronic devices, such as, a cellular communication network or the Internet. Also, the term "input devices" includes any method of inputting information into a computer system, including, but not limited to, a keyboard, a mouse, or a touch screen display.

In one embodiment, the computer system may utilize five (5) different types of coded colors to represent the dominant flavor molecules of both wine and food. The first color may be green, which may be coded as the letter G. The coded color G may represent food and wine having the dominant flavor of anise. The second color may be yellow, which may be coded as the letter Y. The coded color Y may represent food and having the dominant flavor of saffron. The third color may be orange, which may be coded as the letter O. The coded color O may represent food and wine having the dominant flavor of capsaicin. The fourth color may be red, which may be coded as the letter R. The coded color R may represent food and wine having the dominant flavor of umami. The fifth color may be blue, which may be coded as the letter B. The coded color B may represent food and wine having the dominant flavor of maple.

In an alternative or the same embodiment, the computer system may utilize four (4) different coded numbers to represent a residual fruit sugar left over from a wine's fermentation. The residual fruit sugar left over from fermentation may correspond to how dry or sweet a particular wine is. In general, the higher the alcohol content of a wine, the lower the residual sugar may be. For example, the first coded number may be 1, which may represent a very dry wine. The second and third coded numbers may be 2 and 3, which may represent aromatic dry and dry wine, respectively. The fourth coded number may be 4, which may represent sweet wine.

The color and number coding system of the preferred embodiment is not based on subjective taste, but rather is based on molecular gastronomy, and can be considered critical to the present disclosure. For example, the green category may include white, fresh, and clean wines, and light, refreshing foods, including, but not limited to, oysters, summer salads, and minty herbs, such as basil, chives, and tarragon. The yellow category may include wines, such as, chardonnay or rose, and it may include foods, such as butter, cream, lobster, cheese, avocado, corn, and the spice, saffron. The orange category may include spicy foods and contrasting low or moderate alcohol content off-dry or fruity wines, such as Riesling. The red category may include meat and full-flavored fish and complimenting red wines, such as Pinot Noir. The blue category may include sweet flavored food, such as vanilla, toffee, caramel, coconut, butterscotch, and chocolate and complimenting sweet wines, such as Madeira.

The wine-food pairing system disclosed herein unexpectedly solves a number of problems in several relevant fields of art. The first problem solved by the present disclosure, is the inaccessibility of sommeliers to the average consumer. Given that sommeliers are often employed at restaurants and wineries and that most consumers cannot afford to pay for the services of a sommelier every time they want to find an appropriately matched wine for their food, the present disclosure provides an incredibly convenient, accessible, and cost effective system for pairing wine and food. This system may also provide a cost effective option for restaurants, in training staff, that can either not afford to hire a sommelier or simply wish to augment the capabilities of their current sommelier staff.

Aside from providing an incredibly convenient system and method for matching wine and food, the system also provides simplicity for coding during development and integration. For example, other known computer systems that attempt to accurately pair wine and food use a combination of many factors (i.e., more than two), which is difficult to code for. However, the preferred embodiment of the presently disclosed system may only rely on two characteristics, at most, to determine whether a particular wine and chosen food are an appropriate pairing. In other words, the disclosed system may not use more than two characteristics and/or factors. In most embodiments, the two coded characteristics and/or factors that are used to determine correct matches may be a color and a number.

As previously mentioned, this simple and easy-to-use computer system and method also facilitates integration with businesses, such as retailers and restaurants. For example, in one embodiment, the system may be operable to allow restaurant business users to manage a catalog of potential search results based on the restaurant's existing menu. This feature may allow business users to highlight or select specific main ingredients, bridge ingredient, and varietals, while preventing others from being viewed in search results. In one embodiment, the system may also allow business users to manage their employees (e.g., waiters, managers, sommeliers, etc.) by adding and/or inviting users to register with the system and also track their progress, which may be displayed as a chart in the form of a business performance dashboard.

In most embodiments, information for various businesses utilizing the system may be stored in a database along with information regarding various food and wine varietals categorized by color and number. Information regarding different main courses, bridge ingredients, and varietal profiles may be entered or amended in the database by an administrative user. In one embodiment, the system may utilize two independent search engines capable of displaying relevant information from the database in response to user inputs. One search engine may display suggested pairings and the coded colors and numbers for various common dishes and varietals in response to a user input. The other search engine may display a coded flavor profile when a user inputs a specific food. The coded flavor profile may include a list of varietals in the corresponding flavor profile, which may be advantageously used to expose users to the vast number of possibilities that exist in food and wine pairing.

The search engines may be considered critical in the solution provided to another problem solved by the present disclosure. In one embodiment, another problem solved by at least one of the search engines is the limited availability of screen and/or GUI space that plagues computer systems generally. One embodiment of the computer system may solve this problem by being operable to simultaneously display multiple elements on a GUI. For example, the search engine(s) of the computer system may be operable to display a search bar simultaneously with search results including, but not limited to, a list of suggested wines for particular food or meals. Once a search input is entered, other known websites and/or web applications may direct a user away from the page displaying the search bar to a page that only displays search results. However, unlike other known websites and/or web applications, when a user enters a search input into the search bar, the presently disclosed system may not direct the user to a separate webpage displaying only the results. Rather, the presently disclosed system may direct the user to a webpage that simultaneously displays both the search bar and the results upon receipt of the search input. By simultaneously displaying both the search bar and the results, a user of the presently disclosed system may be able to sequentially input food or wine searches without the need to re-navigate to a webpage displaying a search bar.

Another solution is provided for the problem of limited screen space. For example, in one embodiment, the computer system may be operable to simultaneously display a description of a particular wine varietal and one or more examples of specific wines or wineries selling wines within the generic varietal category. In one embodiment, the examples may be displayed as images embedded with hyperlinks, and, in an alternative or identical embodiment, the examples may be displayed as text comprising a hyperlink. Regardless of the embodiment, once clicked on, the hyperlink(s) may direct the computer system's user to a composite webpage that displays both elements of the original webpage and the new webpage.

Typically, with other known computer systems and/or websites, clicking on a hyperlink directs users to a new webpage that does not maintain any content from the original webpage. One of the reasons for this is the limited screen space available on most computer systems. However, by directing users to a composite webpage that displays elements from both the original webpage and the new webpage, the present system may provide users with a convenient way of keeping track of their search and also allow them to easily renavigate to an original webpage by clicking on an element of the original webpage in the composite one.

Turning now to FIG. 1, a diagrammatic representation of one embodiment of the system 1 is shown. In this embodiment, a computing device 2 includes a processor 3 and a memory 4. The processor 3 is operable to execute programming instructions stored in the memory 4, which enables the computing device 2 to display information on a GUI 5. In this embodiment, one or more input devices 6 provide users with a method of accessing the system 1. For example, in this embodiment, the input devices 6 are a keyboard and mouse connected to the computing device 2 though a wired or wireless electronic connection.

The computing device 2 is operable to interface or electronically communicate with a wine-food pairing website by sending at least one request 7 to a server 8 from the processor 3. The server 8 is operable to provide information for displaying the website on the GUI 5 by sending at least one response 9 to the processor 3. The version of the website displayed on the GUI 5 depends on information associated with the presentation layer 10 of the server 8. Other information and files that are critical to website functionality are associated with the data layer 11 of the server 8. Such information and files includes data from third-party service providers 12 and also data stored on a database 13. For end users, the system 1 provides a fast and efficient interface for matching wine and food.

Figure 2:
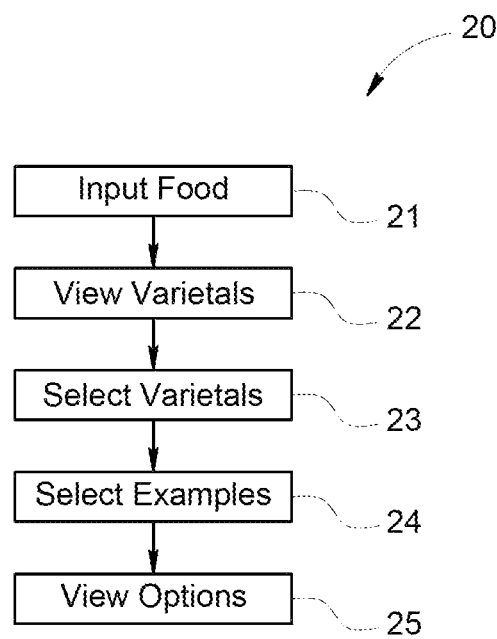
FIG. 2 provides a flowchart representation of one embodiment of the steps performed by a user to operate the system.

FIG. 2 provides a flowchart representation of one embodiment of the steps 20 performed by a user to operate the system 1. First, in this embodiment, the user inputs food information 21 into the computing device 2. Once food information is input 21 into the system 1, the user will receive and view a list of one or more wine varietals 22. The user will then select one or more varietals 23, and each varietal selected will include one or more examples of specific wines and/or wineries for that varietal. The user will then select one of these examples and receive an option to make a purchase 25.

Figure 3:
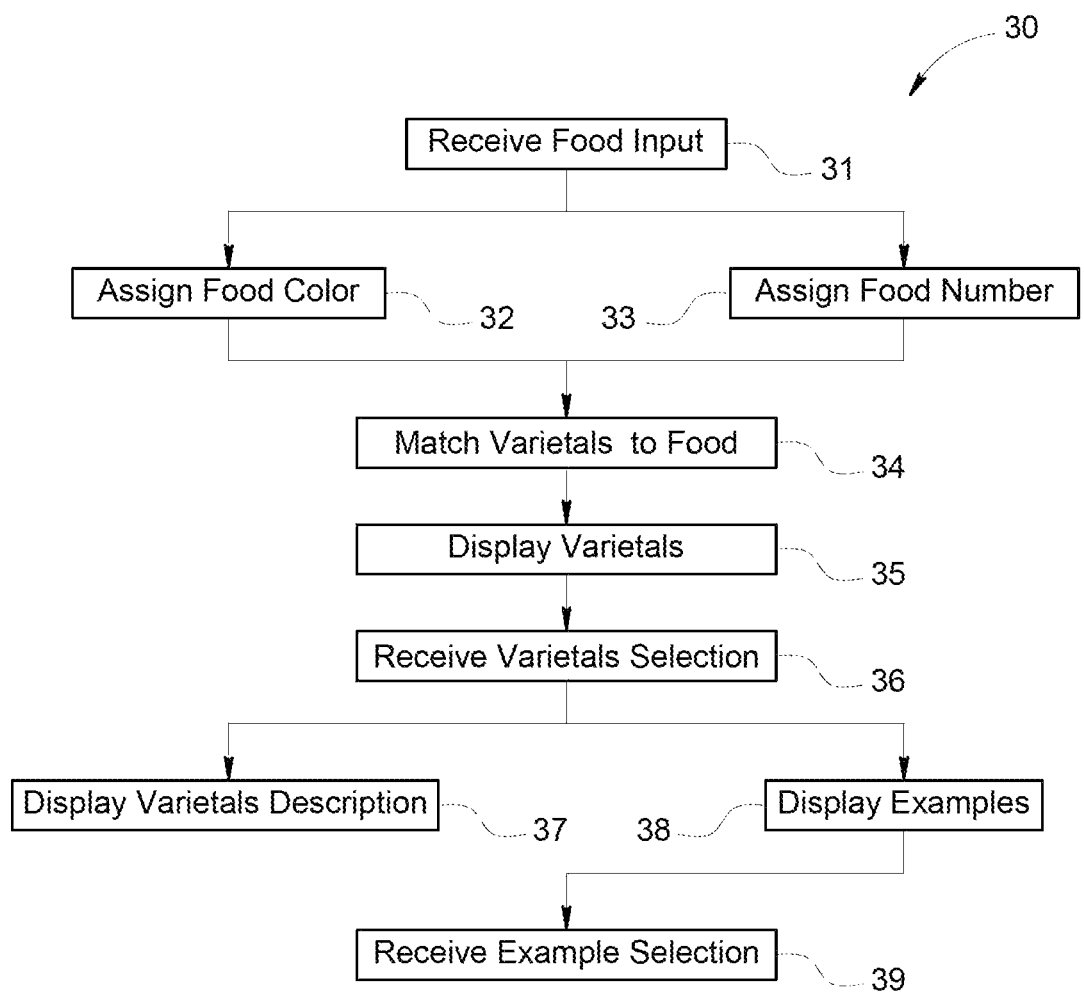
FIG. 3 provides a flowchart representation of one embodiment of the steps performed by the system in response to external inputs.

As the user is performing the steps 20, the system 1 also performs a corresponding series of steps 30. FIG. 3 provides a flowchart representation of one embodiment of the steps 30 performed by the system 1 in response to inputs from a user. In this embodiment, the system 1 is operable to perform these steps by at least one processor. Initially, several components of the system 1 are operable to receive a food input 31. For example, the computing device 2 provides the initial interface for users to input food information. However, the server 8 also receives a food information input 31 when the computing device 2 sends a request 7 to the server 8.

Once the system 1 receives a food input 31, either the processor 3 of the computing device 2 or the server 8 is operable to assign both a coded color 32 and a coded number 33 to the received food input 31. The assigned coded color 32 represents a dominant flavor molecule of the food, and the assigned coded number 33 represents a residual sugar scale of the food. In this embodiment, the system 1 is operable to perform the steps of assigning a coded color 32 and assigning a coded number 33 to the food simultaneously. The system is then operable to match varietals to the input food 34 based on the food's assigned color and number.

After appropriate varietals are matched 34 to the food input, the processor 3 is then operable to display the varietals 35 on the GUI 5 of the computing device 2. The system 1 is then operable to receive a selection of one or more varietals 36. In response to the selection of one or more varietals 36, the system 1 is then operable to display a description of each selected varietal 37. The system 1 is also operable to display examples of specific wines and/or wineries for each selected varietal 38. In this embodiment, the system 1 is operable to perform the steps of displaying a varietal description 37 and a specific wine example 38 simultaneously. After one or more specific examples of a wine varietal are displayed 38, the system is operable to receive a selection of one of the specific examples 39.

FIG. 4 provides a perspective view of a GUI 40 resulting from the steps 30 performed by the system 1. In this embodiment, the GUI 40 simultaneously displays a description 41 of the desired varietal and examples of specific wines 42 associated with the varietal. In this embodiment, the examples of specific wines are displayed via images embedded with hyperlinks 43 that may direct website traffic to specific websites or wineries offering wine associated with the desired varietal. The simultaneous display of these elements solves the problem of limited screen space on computing devices.

In another embodiment, shown in FIG. 5, a GUI 50 also simultaneously displays multiple elements, further solving the problem of limited screen space. In this embodiment, the GUI 50 displays a search bar 51. The search bar 51 provides a way for users to input a desired food or wine selection and see a list of corresponding wine or food recommendations for the desired food or wine. For example, in this embodiment, in response to a food search input from a user, the GUI 50 displays a list of food or meals 52, a list of the coded color and number associated with the dominant flavor and residual sugar scale of the food-wine pair 53, and a list of wine varietal suggestions for the particular food 54. Unlike other websites, the entering of a food or wine search input in the search bar 51 does not direct the user to a separate hyperlink and/or webpage displaying the search results. By maintaining the display of the search bar 51 on the page where the search results are simultaneously displayed, a user is able to sequentially input food or wine searches without the need to re-navigate to a webpage displaying the search bar 51.

While several variations of the present disclosure have been illustrated by way of example in preferred or particular embodiments, it is apparent that further embodiments could be developed within the spirit and scope of the present disclosure, or the inventive concept thereof. However, it is to be expressly understood that such modifications and adaptations are within the spirit and scope of the present disclosure, and are inclusive, but not limited to the following appended claims as set forth.

What is claimed is:

1. A system comprising:
   a computing device, the computing device comprising a processor, a memory, and a graphical user interface;
   wherein the computing device is in electronic communication with a server having a presentation layer;
   wherein the server is operable to respond to a request from the computing device;
   wherein a response from the server includes the presentation layer;
   the computing device is operable to display a wine-food pairing website on the graphical user interface;

wherein the computing device and the server are further operable to:
  receive a first food input;
  assign a color code and a number code to the first food input;
    wherein, the color code is selected from five colors, respectively representing food or wine having the dominant flavors of anise, saffron, capsaicin, umami, and maple;
    wherein, the number code is selected from four numbers, representing a level of residual fruit sugar left over from a wine's fermentation;
  select one or more matching wine varietals to the first food input based on the color code and the number code;
wherein the computing device and the server are further operable to:
  display a hyperlink to a third-party webpage;
  in response to that a user clicks on the hyperlink:
    direct the user to a composite webpage integrating content from both the wine-food pairing website and the third-party webpage.

2. The system of claim 1 wherein the server comprises a data layer.

3. The system of claim 2 wherein the data layer includes information from a third-party service provider.

4. The system of claim 2 wherein the data layer includes information from a database.

5. The system of claim 1 wherein the computing device is operable to display a description of a wine varietal on the graphical user interface.

6. The system of claim 5 wherein the computing device is operable to display a plurality of examples of the wine varietal on the graphical user interface.

7. The system of claim 6 wherein the plurality of examples of the wine varietals are images.

8. The system of claim 7 wherein each of the images comprises an embedded hyperlink.

9. The system of claim 1 wherein the computing device is operable to display a search bar on the graphical user interface.

10. The system of claim 9 wherein the computing device is operable to display a list of a plurality of food and wine pairs simultaneously with the search bar on the graphical user interface.

* * * * *